United States Patent [19]

Kock et al.

[11] Patent Number: 4,728,715

[45] Date of Patent: Mar. 1, 1988

[54] WHOLLY AROMATIC POLYESTERS AND PREPARATION THEREOF

[75] Inventors: Hans-Jakob Kock, Ludwigshafen; Michael Portugall, Wachenheim; Juergen Hambrecht, Münster-Hiltrup, all of Fed. Rep. of Germany

[73] Assignee: BASF Aktiengesellschaft, Ludwigshafen, Fed. Rep. of Germany

[21] Appl. No.: 937,717

[22] Filed: Dec. 4, 1986

[30] Foreign Application Priority Data

Dec. 4, 1985 [DE] Fed. Rep. of Germany ....... 3542815

[51] Int. Cl.⁴ .................... C08G 63/02; C08G 63/18
[52] U.S. Cl. .................................. 528/193; 528/171; 528/176; 528/179; 528/190; 528/194
[58] Field of Search ............... 528/176, 179, 190, 193, 528/194, 271, 171

[56] References Cited

U.S. PATENT DOCUMENTS

| | | | |
|---|---|---|---|
| 4,093,595 | 6/1978 | Elliott | 528/279 |
| 4,118,372 | 10/1978 | Schaefgen | 528/190 |
| 4,375,530 | 3/1983 | Hay et al. | 524/605 |
| 4,564,669 | 1/1986 | Dicke et al. | 528/173 |
| 4,599,397 | 7/1986 | Yoshimura et al. | 528/190 |
| 4,609,720 | 9/1986 | Yoshimura et al. | 528/128 |
| 4,614,789 | 9/1986 | Dicke et al. | 528/128 |
| 4,664,972 | 5/1987 | Connolly | 428/290 |

FOREIGN PATENT DOCUMENTS

| | | |
|---|---|---|
| 0139303 | 5/1985 | European Pat. Off. |
| 1507207 | 4/1978 | United Kingdom |
| 2121422A | 12/1983 | United Kingdom |

*Primary Examiner*—Lucille M. Phynes
*Attorney, Agent, or Firm*—Keil & Weinkauf

[57] ABSTRACT

Wholly aromatic polyesters which form a liquid-crystalline fiber-forming melt below 300° C. and are composed of (a) from 10 to 25 mol % of repeat units of the formula I

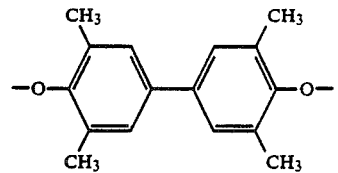

(b) from 5 to 15 mol % of repeat units of the formula II

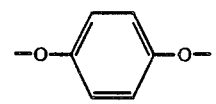

(c) from 5 to 15 mol % of repeat units of the formula III

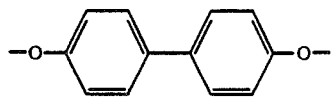

(d) not less than 10 mol % of repeat units of the formula IV

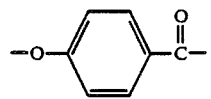

and (e) a molar amount corresponding to the total amount of (a), (b) and (c) of repeat units of the formula V

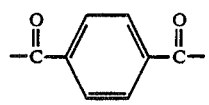

the molar proportions of components a, b, c, d and e adding up to 100 mol % in each case, the preparation thereof and fibers, films, moldings and surface coatings prepared therefrom.

13 Claims, No Drawings

WHOLLY AROMATIC POLYESTERS AND PREPARATION THEREOF

The present invention relates to wholly aromatic polyesters which form a liquid-crystalline fiber-forming melt below 300° C.

Wholly aromatic liquid-crystalline polyesters are known. German Laid-Open Application DOS 3,320,188 discloses liquid-crystalline polyesters which are composed of units derived from 4-hydroxybenzoic acid, terephthalic acid and 4,4'-dihydroxydiphenyl. However, these polyesters only become sufficiently fluent at above 300° C. Their processing into moldings is therefore impaired. Nor can the liquid-crystalline polyesters disclosed in German Laid-Open Application DOS 3,325,703, which are composed of units derived from 4-hydroxybenzoic acid, terephthalic acid, hydroquinone and 4,4'-dihydroxydiphenyl, be processed at below 300° C. In addition, the moldings prepared therefrom are not sufficiently heat-resistant. U.S. Pat. No. 4,093,595 discloses polyesters which are based on 2,6-dimethylhydroquinone, 3,3', 5,5'-tetramethyl-4,4'-dihydroxybiphenyl and terephthalic acid. However, these polyesters do not meet all the requirements of the art and are in need of improvement.

It is an object of the present invention to provide wholly aromatic liquid-crystalline polyesters which form a liquid-crystalline fiber-forming melt below 300° C., which have a very high glass transition temperature, and which also have little, if any, self-color and have a high abrasion resistance and chemical resistance.

We have found that this object is achieved with wholly aromatic polyesters which form a liquid-crystalline fiber-forming melt below 300° C. and are composed of (a) from 10 to 25 mol % of repeat units of the formula I

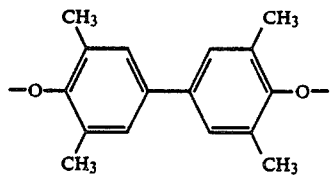

(b) from 5 to 15 mol % of repeat units of the formula II

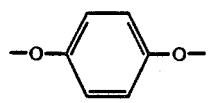

(c) from 5 to 15 mol % of repeat units of the formula III

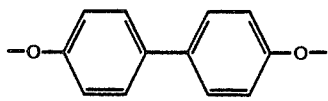

(d) not less than 10 mol % of repeat units of the formula IV

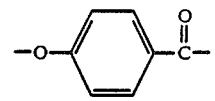

and (e) a molar amount corresponding to the total amount of (a), (b) and (c) of repeat units of the formula V

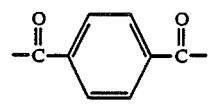

the molar proportions of components a, b, c, d and e adding up to 100 mol % in each case.

The novel wholly aromatic liquid-crystalline polyesters have the advantage of not requiring high processing temperatures and, what is more, of having good long-term use properties even at elevated temperature. They further have little discoloration and a high abrasion resistance and chemical resistance.

The liquid-crystalline state of the polyesters can be detected with a polarization microscope by a method described in German Published Application DAS 2,520,819. Applied in a thickness of 10 μm between glass plates and viewed between crossed polarizers, the polymer melts have textures which can be ascribed to a mesomorphic (nematic) phase.

The polyesters according to the invention are composed of (a) from 10 to 25 mol % of repeat units of the formula I

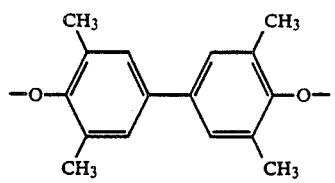

the starting material used advantageously being 3,3',5,5'-tetramethyl-4,4'-dihydroxydiphenyl, (b) from 5 to 15 mol % of repeat units of the formula II

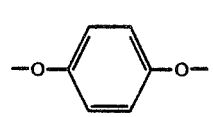

the preferred starting compound being hydroquinone, (c) from 5 to 15 mol % of repeat units of the formula III

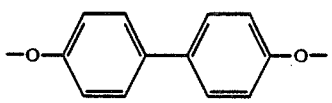

the starting compound being for example 4,4'-dihydroxydiphenyl, (d) not less than 10 mol % of repeat units of the formula IV

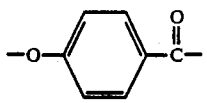

IV the preferred starting compound being 4-hydroxybenzoic acid,
and
(e) a molar amount corresponding to the total amount of (a), (b) and (c) of repeat units of the formula V

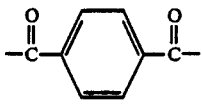

V a suitable starting compound being for example terephthalic acid.

In preferred wholly aromatic polyesters, some of the units (b) and/or (c) are replaced by
(f) repeat units of the formula VI

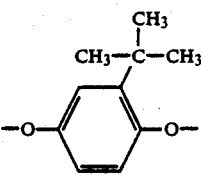

VI a suitable starting material being for example tert.-butylhydroquinone
and/or
(g) repeat units of the formula VII

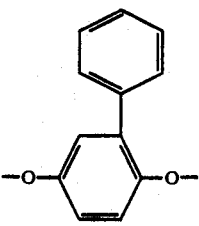

VII a preferred starting compound being phenylhydroquinone.

Advantageously these wholly aromatic polyesters contain the repeat units (f) and/or (g) in an amount of from 2 to 20 mol %. It has further been found to be advantageous if the total amount of the molar proportions of units (a) and (f) and/or (g) ranges from 20 to 40 mol %.

In other preferred wholly aromatic polyesters, some of the units (b) and (c) are replaced by
(h) repeat units of the formula VIII

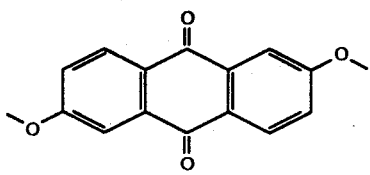

VIII (i) repeat units of the formula IX

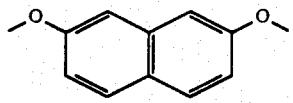

IX (j) repeat units of the formula X

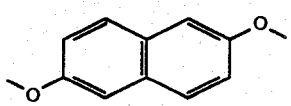

X and/or
(k) repeat units of the formula XI

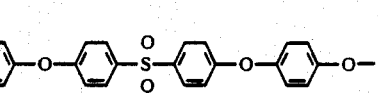

XI the starting materials used being for component (h): 2,6-dihydroxyanthraquinone, for component (i): 2,7-dihydroxynaphthalene, for component (j): 2,6-dihydroxynaphthalene, and for component (k): 4,4'-di(p-hydroxyphenoxy)diphenyl sulfone.

It is advantageous if the total amount of the molar proportions of units (a), (h), (i), (j) and (k) in the polyesters according to the invention ranges from 20 to 40 mol %.

It will be readily understood that in each case the total amount of dihydroxy compound is matched by an equivalent amount of terephthalic acid, and the molar proportions of (a), (b), (c), (d) and (e) add up to 100 mol % in each case.

Preferred wholly aromatic polyesters according to the invention have a glass transition temperature of $\geq 134°$ C., in particular $\geq 140°$ C. This glass transition temperature is measured by the DSC method as described by K. H. Illers et al. in Makromol. Chem. 127 (1969), 1 ff. The wholly aromatic liquid-crystalline polyesters according to the invention form a liquid-crystalline fiber-forming melt at $<300°$ C., in particular $<280°$ C. Preference is also given to liquid-crystalline aromatic polyesters which have partial crystallinity at $>220°$ C. and $<280°$ C.

The liquid-crystalline polyesters according to the invention can be obtained by a number of techniques as described for example in U.S. Pat. Nos. 4,375,530 and 4,118,372.

In an advantageous embodiment, the polyesters according to the invention are obtained in a single-stage process by converting the underivatized starting materials using anhydrides of lower fatty acids, in particular acetic anhydride, in the presence or absence of catalysts. In the reaction, the starting materials are heated together with acetic anhydride, advantageously in a molar excess of not less than 5%, based on the hydroxyl groups present, with stirring in an inert gas atmosphere to a temperature at which reflux occurs. Advantageously the temperature is increased in stages, for example to 150°-200° C. in not more than 5 hours, preferably up to 2 hours, and the temperature is then raised to 300°-350° C., for example in the course of 2-2 ½ hours, during which excess fatty acid anhydrides and fatty acids are distilled off. To complete the reaction, it has been found to be advantageous to employ reduced pressure, for example 5-20 mbar, toward the end.

It is a remarkable and unforseeable feature of this single-stage process that the desired polymers are obtained in a relatively short time in a troublefree and complete reaction without catalysts. This is all the more remarkable as the large number of chemically different hydroxyl groups would be expected to lead to differences in reactivity and hence to inadequate polymer synthesis.

The wholly aromatic liquid-crystalline polyesters thus obtained can be further condensed in the solid state, for example at 150°–250° C., until the desired viscosity is obtained. This postcondensation in solid phase can take place not only before but also after thermoplastic processing.

The wholly aromatic liquid-crystalline polyesters according to the invention are suitable for preparing filaments, films, foams and industrial moldings by injection molding, pressing or extruding.

The invention is illustrated by the following examples.

EXAMPLE 1

0.2 mol of terephthalic acid, 0.26 mol of 4-hydroxybenzoic acid, 0.07 mol of hydroquinone, 0.04 mol of 4,4'-dihydroxybiphenyl, 0.09 mol of 3,3',5,5'-tetramethyl-4,4'-dihydroxybiphenyl and 0.86 mol of acetic anhydride are weighed into a flask equipped with stirrer, nitrogen inlet and distillation attachment. An N₂ atmosphere is established, and the temperature is then raised in a metal bath to initially 100° C., then in 30' to 150° C., in a further 100' to 200° C. and subsequently in 120' to a final temperature of 325° C.

The pressure is then reduced to 560 mbar and subsequently halved every 10'. At the end the pressure is 10 mbar. In this way a highly viscous fiber-forming mesomorphic melt is obtained. DSC measurements indicate a glass transition temperature of 144° C. and a melting point of 285° C. The intrinsic viscosity is 0.9 dl/g, measured at 60° C. in an 0.1% strength by weight solution in pentafluorophenol.

EXAMPLE 2

0.2 mol of terephthalic acid, 0.26 mol of 4-hydroxybenzoic acid, 0.04 mol of 4,4'-dihydroxybiphenyl, 0.07 mol of hydroquinone, 0.05 mol of 2,7-dihydroxynaphthalene, 0.04 mol of 3,3',5,5'-tetramethyl-4,4'-dihydroxybiphenyl and 0.86 mol of acetic anhydride are used as described in Example 1. The liquid-crystalline polyester has a glass transition temperature of 134° C. and an intrinsic viscosity of 1.04 dl/g, and is processable from the melt at 275° C.

EXAMPLE 3

0.2 mol of terephthalic acid, 0.26 mol of 4-hydroxybenzoic acid, 0.05 mol of 2,7-dihydroxynaphthalene, 0.15 mol of 3,3',5,5'-tetramethyl-4,4'-dihydroxybiphenyl and 0.86 mol of acetic anhydride are used as described in Example 1. The liquid-crystalline polyester has a glass transition temperature of 158° C. and an intrinsic viscosity of 0.9 dl/g, and is processable from the melt at 270° C.

We claim:

1. A wholly aromatic polyester which forms a liquid-crystalline fiber-forming melt below 300° C. and is composed of (a) from 10 to 25 mol % of repeat units of the formula I

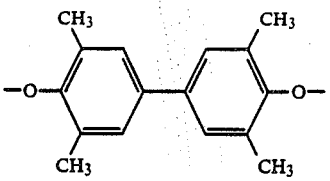

(b) from 5 to 15 mol % of repeat units of the formula II

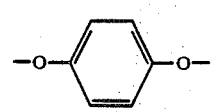

(c) from 5 to 15 mol % of repeat units of the formula III

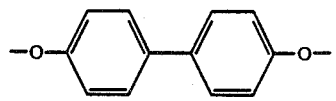

(d) not less than 10 mol % of repeat units of the formula IV

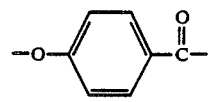

(e) a molar amount corresponding to the total amount of (a), (b) and (c) of repeat units of the formula V

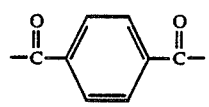

the molar proportions of components a, b, c, d and e adding up to 100 mol % in each case.

2. A wholly aromatic polyester as claimed in claim 1, wherein some of the units of the formula II and/or III are replaced by (f) repeat units of the formula VI

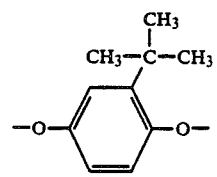

and/or (g) repeat units of the formula VII

VII

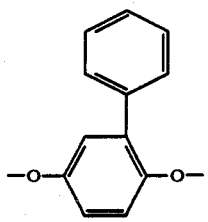

3. A wholly aromatic polyester as claimed in claim 1, which contains the units of the formula VI and/or VII in an amount of from 2 to 20 mol %.

4. A wholly aromatic polyester as claimed in claim 1, wherein the total of the proportions of the units of the formula I and VI and/or VII is from 20 to 40 mol %.

5. A wholly aromatic polyester as claimed in claim 1, wherein some of the units of the formula II and/or III are replaced by (h) repeat units of the formula VIII

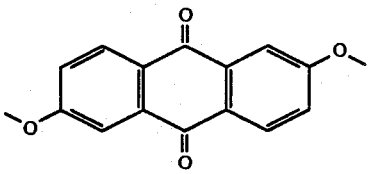

VIII (i) repeat units of the formula IX

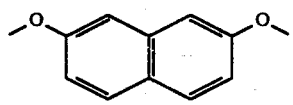

IX (j) repeat units of the formula X

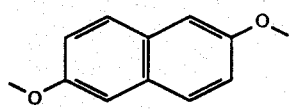

X and/or (k) repeat units of the formula XI

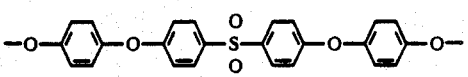

XI

6. A wholly aromatic polyester as claimed in claim 1, wherein the total of the molar proportions of the units of the formula I, VIII, IX, X and XI is from 20 to 40 mol %.

7. A wholly aromatic polyester as claimed in claim 1, which has a glass transition temperature Tg $\geq 134°$ C.

8. A process for preparing an aromatic polyester as claimed in claim 1 by reacting the monomers in one stage in the form of the underivatized hydroxy and carboxy compounds and in the molar ratios described in the presence of excess fatty acid anhydride at elevated temperature and distilling fatty acid anhydride and fatty acid out of the reaction mixture.

9. A process as claimed in claim 8, wherein the wholly aromatic polyester is postcondensed in the solid phase at 150°–250° C.

10. A fiber prepared from a wholly aromatic polyester as claimed in claim 1.

11. A film prepared from a wholly aromatic polyester as claimed in claim 1.

12. A molding prepared from a wholly aromatic polyester as claimed in claim 1.

13. A surface coating prepared from a wholly aromatic polyester as claimed in claim 1.

* * * * *